United States Patent [19]
Eason

[11] 3,854,392
[45] Dec. 17, 1974

[54] WIENER COOKER ATTACHMENT UNIT FOR ROTISSERIES

[76] Inventor: E. Craig Eason, 31323 W. Wind, Fraser, Mich. 48026

[22] Filed: May 7, 1973

[21] Appl. No.: 358,107

[52] U.S. Cl. .............................. 99/421 H, 99/441
[51] Int. Cl. ............................................ A47j 37/04
[58] Field of Search ............. 99/421, 339, 340, 346, 99/420, 423, 427, 443, 445, 441

[56] References Cited
UNITED STATES PATENTS

| | | | |
|---|---|---|---|
| 2,162,793 | 6/1939 | Zmay | 99/421 HV |
| 2,253,434 | 8/1941 | Kernick | 99/421 H X |
| 2,263,715 | 11/1941 | Bobo | 99/421 H |
| 2,502,818 | 4/1950 | Bocchino | 99/421 H X |
| 2,604,842 | 7/1952 | Dolce | 99/423 |
| 3,084,616 | 4/1963 | Nissen et al. | 99/423 |
| 3,125,015 | 3/1964 | Schlaegel | 99/421 P |
| 3,331,307 | 7/1967 | Hoffert | 99/339 |

Primary Examiner—Harvey C. Hornsby
Assistant Examiner—Arthur O. Henderson
Attorney, Agent, or Firm—Whittemore, Hulbert & Belknap

[57] ABSTRACT

An attachment is shown for converting a typical domestic broiling spit-type rotisserie for the cooking of elongated food products such as wieners or sausages over coals or other heating means. The attachment comprises a frame structure including two generally triangular members, one of which is in the form of a housing, one or both of such members having means for readily and easily mounting the same to the spit to hang in a dependent relation to the latter over the coals. Along the bottom horizontal reach of the structure the frame members rotatively mount a series of parallel elongated and laterally spaced rollers, which cradle the wieners for rotation at a relatively slow rate when said rollers are rotated about their individual axes. To this end the housing-type frame member, as constituted by a pair of like triangular face-to-face engaged sheet metal stampings, houses a plurality of sprockets, one fixedly attached to an end of each cradling roller, as well as a main drive sprocket located adjacent the upper apex of the housing. The last-named sprocket is positively rotated by a releasable set screw connection to the spit, as the latter is rotated by a motorized speed-reducing drive unit; and an endless serrated belt is trained in a triangular outline about the upper drive sprocket and in driving engagement with the driven sprockets of the roller series.

14 Claims, 6 Drawing Figures

PATENTED DEC 17 1974 3,854,392

WIENER COOKER ATTACHMENT UNIT FOR ROTISSERIES

BACKGROUND OF THE INVENTION

1. Field of the Invention

The device or attachment of the invention finds its primarily intended application in the enjoyment of outdoor cook-out rotisserie installations such as are in common vogue, affording a means by which such a rotisserie can be converted from a general use of its conventional motor-driven spit to a special use from time to time or as desired in the broiling of wieners, sausages, corn ears and the like. However, it is contemplated that more general applications of the improvement may well be in order, for example in restaurants, drive-in eating establishments, etc.

2. Description of the Prior Art

A search has revealed the following patents:

| | | | |
|---|---|---|---|
| Schwarz et al | 3,643,588 | Nelems | 2,828,686 |
| Hoffert | 3,331,308 | Panken | 2,602,392 |
| Hoffert | 3,331,307 | Bobo | 2,310,349 |
| Jigamian | 2,966,841 | Dumas | 2,185,979 |

Of these, the Hoffert and Dumas patents disclose rotary or roasting devices for the general purpose of applicant's, although not in any sense a rotary unit in the form of an attachment which can be readily applied releasably to a driven spit. Moreover, the driving arrangements whereby a series of cradling rollers are rotated involve either an expensive worm and worm gear driving arrangement of a permanent nature, as in Dumas, or a train of meshing gears, also expensive in nature and apt to become jammed, as in the Hoffert patents. Panken discloses an endless arrangement of food supports driven in a flexible conveyor fashion; and the Schwarz et al. and Bobo patents also show types of traveling mounts for hotdogs or the like, but none of these three is at all pertinent to the invention herein illustrated, described and claimed.

SUMMARY OF THE INVENTION

The rotisserie device is of a very inexpensive construction, constituted in its entirety by sheet metal plate and stamped components, tubular wiener supporting rollers and belt and sprocket structure, affording a positive drive of the rollers without likelihood of jamming or otherwise becoming imperfectly or wholly inoperable. The belt and sprocket drive unit is encased in toto in the housing, and protected against deterioration under the severe heat condition to which it is exposed, as well as against deterioration as exposed to the elements. All of the applicability of the ordinary rotisserie is retained, in respect to the broiling or roasting of single food objects, for example fowl, roast beef, etc., yet the improvement affords a substantially instantly available convertability of the driven spit of the rotisserie to the cooking of wieners and the like in multiple as desired.

DESCRIPTION OF A PREFERRED EMBODIMENT

Figure 1:
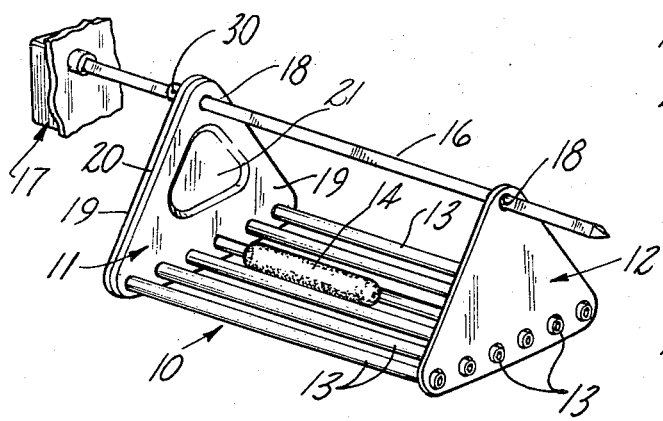
FIG. 1 is a fragmentary perspective view showing the attachment of the invention as applied to and driven, as to its belt and sprocket internal power unit, by a rotisserie spit on which the device is suspended.

The improved rotisserie attachment of the invention, as generally designated by the reference numeral 10, comprises a frame structure including a housing 11 and a frame plate 12 in longitudinally spaced relation to said housing, which frame parts sustain a series of elongated parallel rollers 13 to cradle in any appropriate number food articles to be broiled, such as a wiener 14, over rotisserie coals. Rollers 13 are mounted relative to frame members 11, 12 in a manner to enable a ready separation therefrom as desired, for cleaning or other purposes.

Frame members 11 and 12 are of identical, substantially equilateral triangular outline; and the plate and housing frame members have means for a releasable suspension thereof from the usual rotisserie spit 16, rotatively driven in a conventional manner by a speed reduction electric drive motor 17. To this end, housing 11 and end frame plate 12 have apertures 18 in which the spit 16 is rotatively received, the location of the apertures being adjacent the top apices of the frame parts, so that the device 10 has an equal distribution of its weight on the spit.

Figure 4:
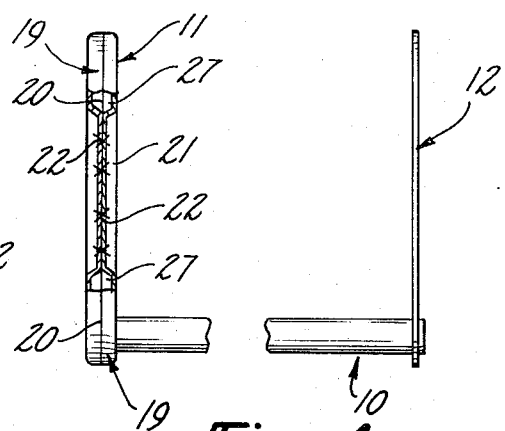
FIG. 4 is another top plan view of the attachment, being broken away and in horizontal section on line 4—4 of FIG. 3.

As depicted in FIG. 4, the housing member 11 is constituted of two identical sheet metal stampings 19 which have an abutted relation to one another at zones 20 outlining the triangular contour thereof; and centrally between these zones, the two stamped plate members 19 are embossed at 21 sufficiently deeply to afford internal triangular areas at which they have face-to-face contacting engagement. In this zone the housing members 19 are rigidly connected by spot weldments 22 to one another, thereby affording a housing structure of considerable rigidity and ruggedness.

Figure 5:
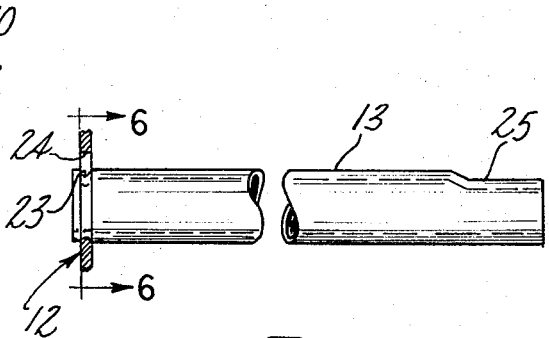
FIG. 5 is a broken view illustrating the removable mounting of a turning roller of the attachment on an end wall plate of the frame.
Figure 6:
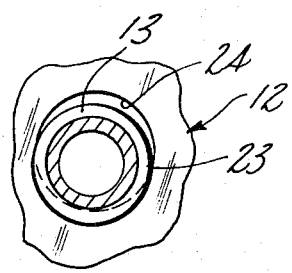
FIG. 6 is a fragmentary view in vertical section on a line 6—6 of FIG. 5.

FIGS. 5 and 6 show a structural detail enabling the frame cradling rollers 13 to be rotatively supported on the housing and plate parts 11, 12, yet to permit ready dismantling of the rollers from these components as desired. Thus, end plate 12 is stamped to provide journal openings 24 in a number corresponding to the number of rollers 13, these openings being a bit larger in diameter than the diameter of the rollers; and each roller is provided adjacent an end thereof with a circularly rolled groove 23. The groove is sufficiently deep to seat over the bottom of a plate opening 24 and thus afford a journal of the roller on said plate; and the roller may be lifted sufficiently to enable its full outer diameter to clear opening 24 in withdrawing the roller. At its opposite end, the roller 13 is ungrooved, fitting in an opening of corresponding diameter in the inner stamping 19 of housing 11, and at this end the roller is formed to provide an axially extending indentation 25, at which a sprocket of the drive unit of the attachment is slidingly applied and keyed for rotation with the roller.

Figure 2:
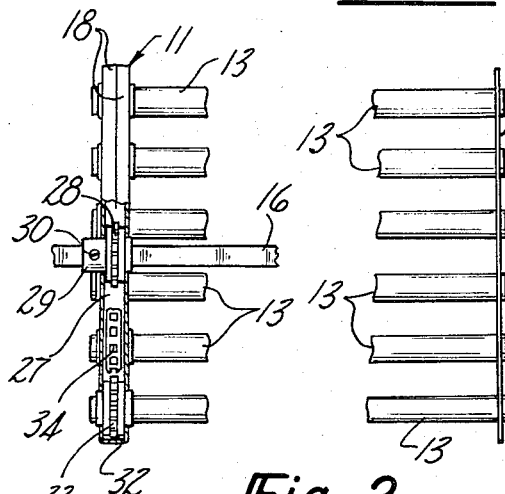
FIG. 2 is a fragmentary top plan view of the installation, being partially broken away at a housing to show the belt and sprocket drive unit.
Figure 3:
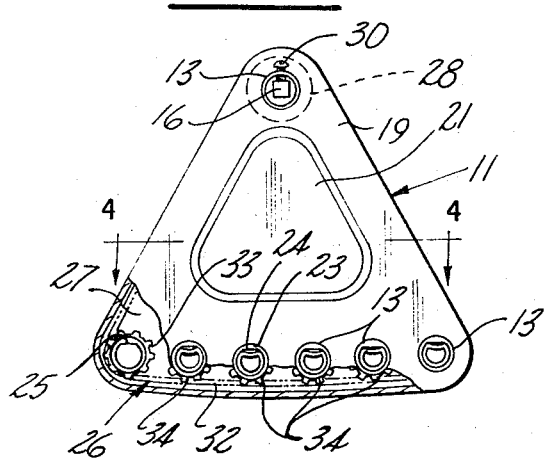
FIG. 3 is an end elevational view of the device, also being partially broken away for the same purpose.

Reference may be had to FIGS. 2 and 3, in conjunction with FIGS. 1 and 4 in connection with a belt and sprocket unit, generally designated by the reference numeral 26, by which the rollers are continuously rotated about their individual parallel axes in the use of attachment 10. Drive unit 26 is disposed in the triangularly contoured space 27 between housing stampings 19; and as appears in FIG. 2, this unit comprises a top driving sprocket 28 at the upper apex of the space, which sprocket is releasably secured at an outer hub formation 29 thereof by a set screw 30. Thus, rotation of spit 16 correspondingly drives sprocket 28 for a toothed continuous drive of a serrated-type belt 32 trained over the top of drive sprocket 28. The chain trains downwardly and beneath a first idler sprocket 33, journaled on housing plates 19 adjacent one lower triangular corner of the housing, which sprocket 33 is keyed at the groove 25 to an end of an outside wiener-cradling roller 13. The belt then passes beneath and in toothed driving engagement with a set of intermediate cradling roller sprockets 34, then about a similar sprocket on the roller 13 adjacent the opposite lower corner of the housing, for upward movement again about the main drive sprocket 28.

Accordingly, all of the cradling rollers 13 are positively driven in the operation of the device, and, per FIG. 3, it will be noted that the arrangement of the parallel axes of the intermediate driven sprockets 34 and rollers 13 is in a mildly arcuate contour, so that a continuous positive engagement without the possibility of slip is had in respect to all of the cradling rollers across the width of the attachment.

What is claimed is:

1. A rotisserie device to be driven by an elongated rotary rotisserie member, comprising a frame having means to non-rotatively suspend the same at an upper portion thereof from said member in dependent relation thereto despite rotation of the member, at least two elongated and parallel driven rollers mounted on said frame to cradle a wiener or like object to be broiled, and a driven unit carried by said frame, including an endless flexible power-transmitting member, a rotary member about which said flexible member is trained for drive, said rotary member being connectable to said rotary rotisserie member for rotation by the latter, and a plurality of rotary driven members across which said flexible power-transmitting member is passed for their drive, at least some of said driven members each being fixedly connected to an object-cradling roller to rotatively drive the latter.

2. An attachment for a rotisserie adapted to be mounted on and driven by a rotary spit of the latter, comprising a frame having means to non-rotatively suspend the same at an upper portion thereof from said spit in dependent relation thereto despite rotation of the spit, said frame being provided with at least two elongated and parallel driven rollers to cradle a wiener or like object to be broiled, and a driven unit carried by said frame, including an endless flexible power-transmitting member, a rotary member about which said flexible member is trained for drive, said rotary member being releasably connectable to said spit for rotation by the latter, and a plurality of rotary driven members across which said flexible power-transmitting member is passed for their drive, at least some of said driven members each being fixedly connected to an object-cradling roller to rotatively drive the latter.

3. The device of claim 1, in which said flexible power-transmitting member is a serrated-type belt and said rotary members are sprockets having driving engagement with said belt.

4. The device of claim 3, in which said frame includes a housing in which said driven unit is wholly enclosed for a protected operation of the belt and sprockets of the unit.

5. The attachment of claim 2, in which said flexible power-transmitting member is a serrated-type belt and said rotary members are sprockets having driving engagement with said belt.

6. The attachment of claim 5, in which said frame includes a housing in which said driven unit is wholly enclosed for a protected operation of the belt and sprockets of the unit.

7. The attachment of claim 6, in which said frame is of triangular outline, being suspended at an upper apex thereof in said dependent relation to the spit.

8. The attachment of claim 6, in which said frame is of triangular outline, being suspended at an upper apex thereof in said dependent relation to the spit, said housing of the frame comprising a pair of like stampings welded to one another at flat face-contacting surfaces thereof.

9. The device of claim 1, in which said frame includes a housing in which said driven unit is wholly enclosed for a protected operation of the flexible powertransmitting and rotary members of the unit.

10. The attachment of claim 2, in which said frame includes a housing in which said driven unit is wholly enclosed for a protected operation of the flexible power-transmitting and rotary members of the unit.

11. The device of claim 10, in which said frame is of triangular outline, being suspended at an upper apex thereof in said dependent relation to the spit, said housing of the frame comprising a pair of like stampings welded to one another at flat face-contacting surfaces thereof.

12. The device of claim 1, in which said frame is of triangular outline, being suspended at an upper apex thereof in said dependent relation to the rotisserie member.

13. A rotisserie device to be driven by a rotary spit, comprising a frame having at least two elongated and parallel driven rollers to cradle a wiener or like object to be broiled, and a driven unit carried by said frame, including an endless flexible power-transmitting member, a rotary member about which said flexible member is trained for drive, said rotary member being connectable to said spit for rotation by the latter, and a plurality of rotary driven members across which said flexible power-transmitting member is passed for their drive, at least some of said driven members each being fixedly connected to an object-cradling roller to rotatively drive the latter, said frame having means enabling it to depend from said spit and including a plate part by which said driven cradling rollers are at least partially supported for rotation, said rollers each being formed adjacent an end thereof with an annular concentric groove, said plate part having openings proportioned to removably receive said roller ends with the respective roller grooves resting on lower edges of a respective plate part openings.

14. An attachment for a rotisserie adapted to be mounted on and driven by a rotary spit of the latter, comprising a frame having at least two elongated and parallel driven rollers to cradle a wiener or like object to be broiled, and a driven unit carried by said frame, including an endless flexible power-transmitting member, a rotary member about which said flexible member is trained for drive, said rotary member being releasably connectable to said spit for rotation by the latter, and a plurality of rotary driven members across which said flexible power-transmitting member is passed for their drive, at least some of said driven members each being fixedly connected to an object-cradling roller to rotatively drive the latter, said frame having means enabling it to depend from said spit and including a plate part by which said driven cradling rollers are at least partially supported for rotation, said rollers each being formed adjacent an end thereof with an annular concentric groove, said plate part having openings proportioned to removably receive said roller ends with the respective roller grooves resting on lower edges of a respective plate part openings.

* * * * *